United States Patent [19]

Suzuki et al.

[11] Patent Number: 5,586,249
[45] Date of Patent: Dec. 17, 1996

[54] CONTROL INFORMATION BACKUP SYSTEM

[75] Inventors: Shoji Suzuki; Shuji Kimura; Hiroichi Nara; Yasuhiko Sasaki, all of Kawasaki, Japan

[73] Assignee: Fujitsu Limited, Kanagawa, Japan

[21] Appl. No.: 501,512

[22] Filed: Jul. 12, 1995

Related U.S. Application Data

[63] Continuation of Ser. No. 16,818, Feb. 10, 1993, abandoned.

[30] Foreign Application Priority Data

Feb. 10, 1992 [JP] Japan ................................ 4-023912

[51] Int. Cl.$^6$ ........................................... G06F 11/00
[52] U.S. Cl. ............................... 395/182.11; 395/182.12; 395/182.20; 364/268; 364/269.2
[58] Field of Search ......................... 395/182.11, 182.03, 395/182.12, 182.13, 182.20; 371/2.2, 21.1, 8.1; 364/221, 239, 265.5, 268

[56] References Cited

U.S. PATENT DOCUMENTS

| | | | |
|---|---|---|---|
| 4,141,066 | 2/1979 | Keiles | 364/119 |
| 4,351,023 | 9/1982 | Richer | 371/9.1 |
| 4,527,271 | 7/1985 | Hallee et al. | 371/20.1 |
| 4,562,528 | 12/1985 | Baba | 371/9.1 |
| 4,590,554 | 5/1986 | Glazer et al. | 371/7 |
| 4,634,110 | 1/1987 | Julich et al. | 371/11.1 |
| 4,747,041 | 5/1988 | Engel et al. | 364/492 |
| 4,881,227 | 11/1989 | Bühren | 371/9.1 |
| 4,985,824 | 1/1991 | Husseiny et al. | 364/187 |
| 5,089,958 | 2/1992 | Horton et al. | 395/575 |
| 5,185,693 | 2/1993 | Loftis et al. | 371/9.1 |
| 5,193,154 | 3/1993 | Kitajima et al. | 395/250 |
| 5,226,157 | 7/1993 | Nakano et al. | 395/600 |
| 5,270,917 | 12/1993 | Kimura | 371/9.1 |
| 5,335,327 | 8/1994 | Hisano et al. | 395/425 |
| 5,379,417 | 1/1995 | Lui et al. | 395/575 |

FOREIGN PATENT DOCUMENTS

| | | |
|---|---|---|
| 58-88958 | 5/1983 | Japan . |
| 3-98320 | 4/1991 | Japan . |
| 4-100397 | 4/1992 | Japan . |

*Primary Examiner*—Robert W. Beausoliel, Jr.
*Assistant Examiner*—Dieu-Minh Le

[57] ABSTRACT

A control information backup system includes a control unit which is driven by a first power unit and includes a memory for storing software control information which is used during a software operation of the control unit, and a plurality of independent units which are coupled to the control unit and are controlled by the control unit. The independent units are driven by respective second power units which are different from the first power unit and include a memory. The control unit includes a processor for storing the software control information in the memory of arbitrary ones of the independent units, and for reading out the software control information from the memory when making a recovery process after a failure of the first power unit.

7 Claims, 7 Drawing Sheets

CONTROL INFORMATION BACKUP SYSTEM

This is a continuation of application Ser. No. 08/016,818, filed Feb. 10, 1993, now abandoned.

BACKGROUND OF THE INVENTION

The present invention generally relates to control information backup systems, and more particularly to a control information backup system which is applicable to a system which includes a control unit and one or a plurality of independent units which are controlled by the control unit, where the control unit and the independent units are powered by different power sources.

For example, a transmission system may include a control unit and one or a plurality of independent units which are controlled by the control unit. The operation of the transmission system at the time of a power failure is guaranteed by supplying the power to the control unit and the independent units from different power sources. In such a transmission system, control information of the transmission system must not only be preserved when the power source of the independent unit fails but also when the power source of the control unit fails.

FIG. 1 shows an essential part of an example of a conventional control information backup system. In FIG. 1, an external system 100 is coupled to a transmission system 300 which includes a control unit 1 and a plurality of independent units $5_1$ through $5_n$.

The control unit 1 includes a man-machine interface (MMI) 11, an interface 12 which is coupled to the external system 100, a central processing unit (CPU) 13, a memory 14 and a non-volatile memory 15 which are coupled via a common bus 16 of the CPU 13. A bus extension circuit 17 is coupled to the common bus 16, and a power unit 18 supplies power to various parts of the control unit 1. In this example, the memory 14 includes a read only memory (ROM) and a random access memory (RAM) which store control programs to be executed by the CPU 13 and various control information. In addition, the non-volatile memory 15 is an electrically erasable programmable ROM (EEPROM).

On the other hand, the independent unit $5_1$ includes receivers 21 and 21' monitors 22 and 22', a selector 23, a flip-flop 24, a bus decoder 25, a tri-state buffer circuit 26, an internal control bus 28, a bus extension circuit 29, and a power unit $30_1$. The remaining independent units $5_2$ through $5_n$ have the same construction as the independent unit $5_1$, and an illustration thereof will be omitted.

The control unit 1 and the independent units $5_1$ through $5_n$ are coupled to each other via a control bus 19.

In the control unit 1, the CPU 13 controls the operation of the independent units $5_1$ through $5_n$ based on descriptive information received from the external system 100 or the MMI 11. On the other hand, in the independent unit $5_1$, for example, transmission lines of a main line (channel) $CH_0$ and a protection line (channel) $CH_0'$ are provided, and a line switching operation is carried out under the control of the CPU 13. The remaining independent units $5_2$ through $5_n$ operate similarly to the independent unit $5_1$.

For example, the descriptive information from the external system 100 may include "fixed mode and specified channel" and "automatic mode and specified channel" if the transmission system 300 forms a cross-connect system which cross-connects a plurality of transmission paths In the "automatic mode" the cross-connect system automatically selects a normal channel if an abnormality is detected in a channel and an alarm is generated in this channel. On the other hand in the "fixed mode" the cross-connect system fixedly selects a channel regardless of whether or not an alarm is generated in this channel. Out of such descriptive information, the CPU 13 treats mode information such as "fixed mode" and "automatic mode" as software control information which are to be processed internally by software. On the other hand, the CPU 13 treats channel information of the "specified channel" as physical control information which is to be actually set with respect to the hardware. The CPU 13 holds the descriptive information (control information) in the memory 14 and carries out the control described below.

In other words, if the mode information stored in the memory 14 is "fixed mode" the CPU 13 controls the independent unit $5_1$ to select the line $CH_0$ or $CH_0'$ depending on the channel information. More particularly, if the CPU 13 outputs to the common bus 16 a selection command for selecting the line $CH_0$, the bus decoder 25 of the independent unit $5_1$ decodes this selection command on the control bus 28 and sets a bit data "0" on the control bus 28 into the flip-flop 24. In addition, if the CPU 13 outputs a selection command for selecting the line $CH_0'$, the bus decoder 25 similarly sets a bit data "1" into the flip-flop 24.

On the other hand, if the mode information stored in the memory 14 is "automatic mode" the CPU 13 first controls the independent unit $5_1$ to select the line $CH_0$ or $CH_0'$ depending on the channel information, and then monitors the error detection of the monitor 22 or 22' so as to automatically switch the line to the normal system. In other words, the CPU 13 appropriately reads the error detection information via the buffer circuit 26 by outputting a sense command to the common bus 16, and controls the independent unit $5_1$ to select the line $CH_0'$ if an error is detected in the line $CH_0$ and to selects the channel $CH_0$ if an error is detected in the line $CH_0'$.

For example, if the power unit $30_1$ of the independent unit $5_1$ fails during the operation of the transmission system 300, the independent unit $5_1$ fails but the operations of the control unit 1 and the remaining independent units $5_2$ through $5_n$ are not affected thereby. In addition, when the power unit $30_1$ recovers, the control unit 1 can restart the independent unit $5_1$ from the state before the failure occurred based on the control information stored in the memory 14.

On the other hand, if the power unit 18 of the control unit 1 fails during the operation of the transmission system 300, the control unit 1 fails. In this case, the independent units $5_1$ through $5_n$ can continue the operations in the respective states even though no new control is made from the control unit 1. However, when the power unit 18 recovers, the control information is no longer stored in the memory 14, and for this reason, the control unit 1 cannot be recovered to the control state before the failure occurred.

Even in the above described state, the control information which is set in each hardware of the independent units $5_1$ through $5_n$ from the CPU 13 can be recovered by each hardware. However, the control information (mode information or the like) which is referred internally in the CPU 13 by the software of the CPU 13 cannot be recovered. For this reason, the external descriptive information (control information) is conventionally saved in the non-volatile memory 15, so that the CPU 13 can also recover the control information which is required by the software thereof.

But the stored data within the non-volatile memory 15 may also be destroyed. Particularly in the example shown in FIG. 1 where the same power unit 18 powers the control unit 1 and the non-volatile memory 15, there is a danger that the stored data of the non-volatile memory 15 will be destroyed with the failure of the control unit 1. It is conceivable to provide an independent backup power unit exclusively for the non-volatile memory 15, however, this will result in an increased cost of the transmission system 300. Furthermore, the non-volatile memory 15 may be replaced, and when such a replacement takes place, it is conventionally necessary to reset the control information from the external system 100 or the like.

SUMMARY OF THE INVENTION

Accordingly, it is a general object of the present invention to provide a novel and useful control information backup system in which the problems described above are eliminated.

Another and more specific object of the present invention is to provide a control information backup system comprising a control unit which is driven by a first power unit and includes first memory means for storing software control information which is used during a software operation of the control unit, and a plurality of independent units which are coupled to the control unit, are controlled by the control unit, and are driven by respective second power units which are different from the first power unit and including second memory means, where the control unit includes control means for storing the software control information in the second memory means of arbitrary ones of the independent units, and for reading out the software control information from the second memory means when making a recovery process after a failure of the first power unit. According to the control information backup system of the present invention, it is possible to recover even the software control information which could not be recovered by the conventional system. In addition, it is possible to cope with various kinds of failures of the power units of the control unit and the independent units. Therefore, it is possible to considerably improve the reliability of a system such as a transmission system to which the present invention is applicable.

Other objects and further features of the present invention will be apparent from the following detailed description when read in conjunction with the accompanying drawings.

DESCRIPTION OF THE PREFERRED EMBODIMENTS

Figure 2:
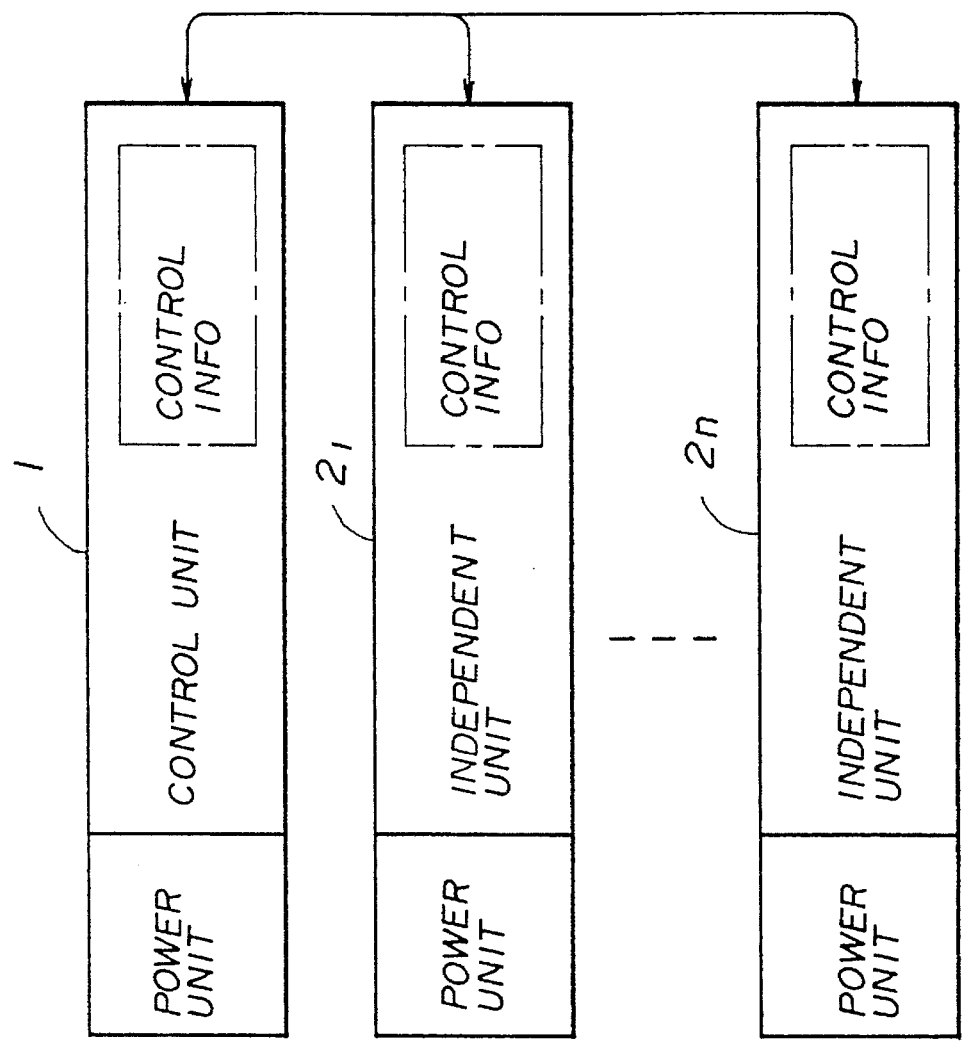
FIG. 2 is a system block diagram for explaining the operating principle of the present invention.

First, a description will be given of the operating principle of the present invention, by referring to FIG. 2. A control information backup system shown in FIG. 2 includes a control unit 1, and one or a are coupled to the control unit 1. The control unit 1 plurality of independent units $2_1$ through $2_n$ which and the independent units $2_1$ through $2_n$ operate using mutually different power units.

Control information which is held by the software of the control unit 1 is also stored by the one or plurality of independent units $2_1$ through $2_n$. In addition, the control information stored in the one or plurality of independent units $2_1$ through $2_n$ can be read out from the control unit 1.

If the power unit of the independent unit $2_1$ fails, for example, the control unit 1 restarts the independent unit $2_1$ from the state before the failure occurred based on the software and physical control information which is stored in the control unit 1. On the other hand, if the power unit of the control unit 1 fails, the control unit 1 recovers the software control information stored in the one or plurality of independent units $2_1$ through $2_n$ so as to recover the control unit 1.

In other words, the software control information which could not be recovered conventionally can be recovered in the present invention because the software control information is stored in the control unit 1 and the one or plurality of independent units $2_1$ through $2_n$. As a result, it is possible to provide a sufficient backup of the control information for various kinds of failures of the power units.

The control information which is held by the software of the control unit 1 may be distributively stored in the one or plurality of independent units $2_1$ through $2_n$. In addition, the control information which is physically set with respect to each hardware of the one or plurality of independent units $2_1$ through $2_n$ may be made readable by each hardware.

Accordingly, even if the power unit of the control unit 1 fails, it is possible to efficiently recover the software and physical control information from the one or plurality of independent units $2_1$ through $2_n$ even if the power unit of the control unit 1 fails, and the control unit 1 can be restarted from the state before the failure occurred.

Figure 3:
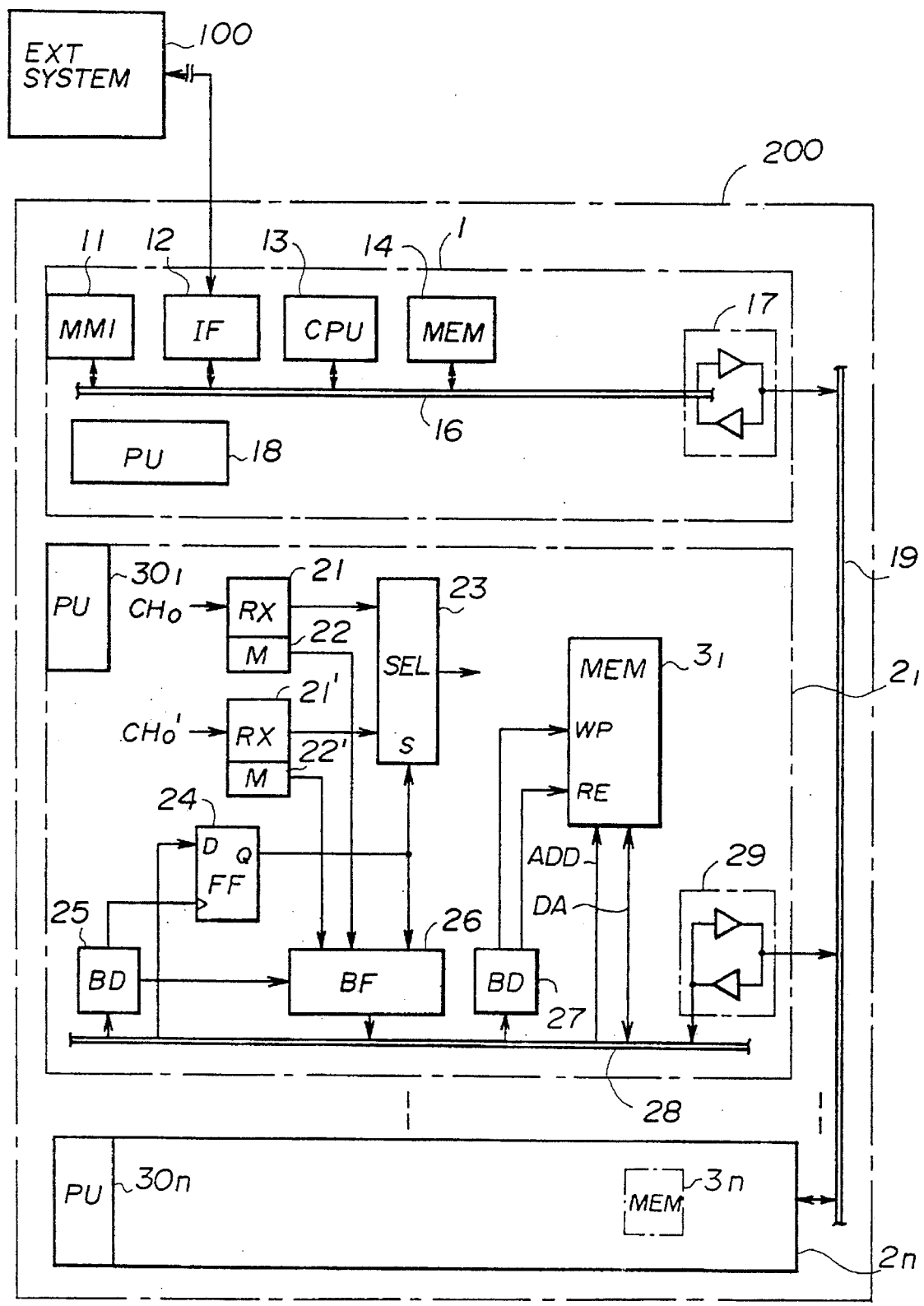
FIG. 3 is a system block diagram showing an essential part of an embodiment of a control information backup system according to the present invention.

Next, a description will be given of an embodiment of the control information backup system according to the present invention, by referring to FIG. 3. FIG. 3 shows an essential part of this embodiment. In FIG. 3, those parts which are the same as those corresponding parts in FIG. 1 are designated by the same reference numerals, and a description thereof will be omitted.

In FIG. 3, an external system 100 is coupled to a transmission system 200 which includes a control unit 1 and a plurality of independent units $2_1$ through $2_n$. For example, the transmission system 200 may form a cross-connect system which cross-connects a plurality of transmission paths.

The control unit 1 includes a man-machine interface (MMI) 11, an interface 12 which is coupled to the external system 100, a central processing unit (CPU) 13 and a memory 14 which are coupled via a common bus 16 of the CPU 13. A bus extension circuit 17 is coupled to the common bus 16, and a power unit 18 supplies power to various parts of the control unit 1. In this embodiment, the memory 14 includes a read only memory (ROM) and a random access memory (RAM) which store control programs to be executed by the CPU 13 and various control information.

Figure 1:
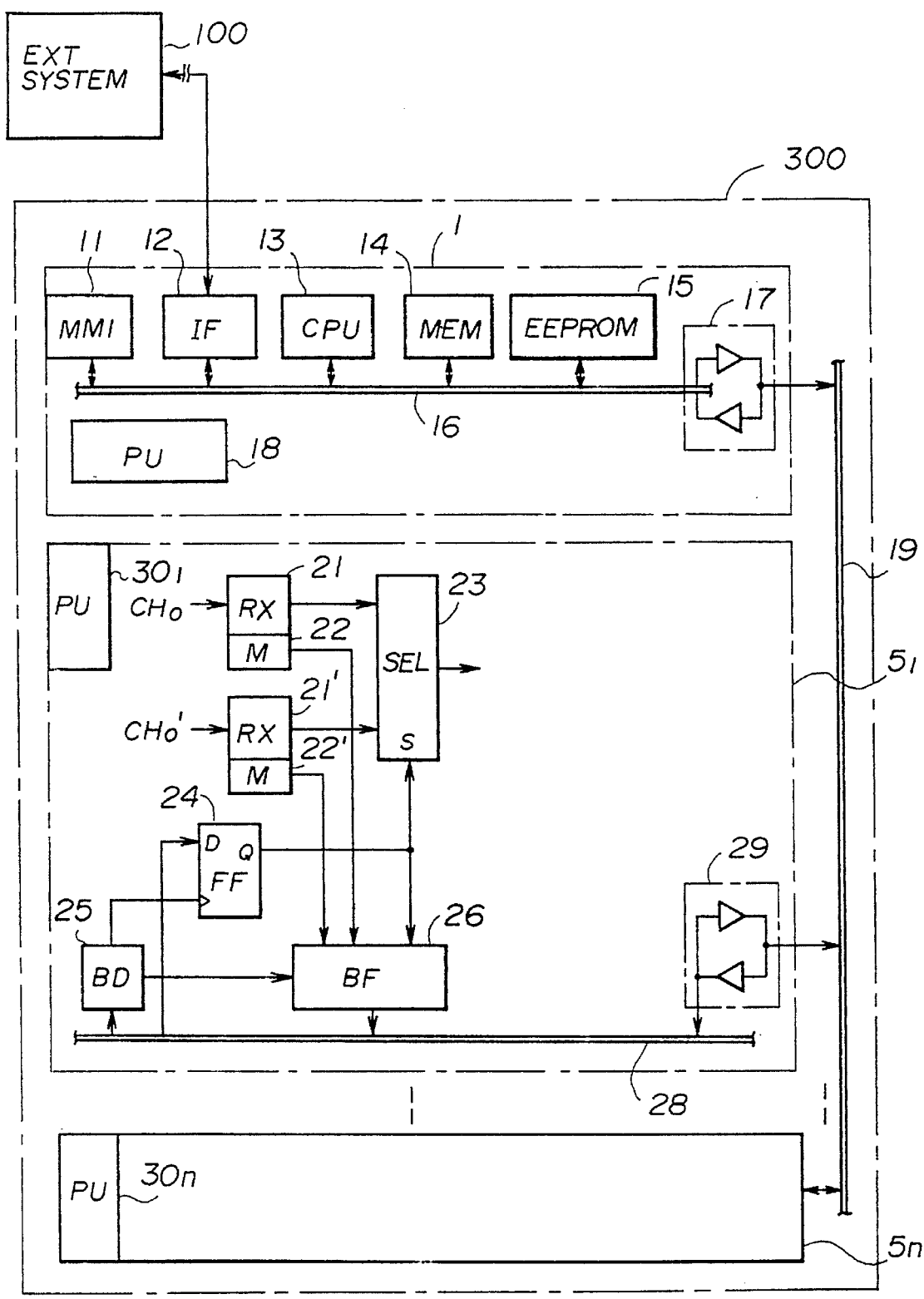
FIG. 1 is a system block diagram showing an essential part of an example of a conventional control information backup system.

Of course, it is possible to additionally provide a non-volatile memory such as an electrically erasable programmable ROM (EEPROM) as in the case of the conventional example shown in FIG. 1.

On the other hand, the independent unit $2_1$ includes a memory $3_1$, receivers 21 and 21', monitors 22 and 22', a selector 23, a flip-flop 24, bus decoders 25 and 27, a tri-state buffer circuit 26, an internal control bus 28, a bus extension circuit 29, and a power unit $30_1$. The remaining independent units $2_2$ through $2_n$ have the same construction as the independent unit $2_1$, and an illustration thereof will be omitted.

The control unit 1 and the independent units $2_1$ through $2_n$ are coupled to each other via a control bus 19.

The control unit 1 stores at least the software control information which is held by the software of the control unit 1 into at least one of memories $3_1$ through $3_n$ of the independent units $2_1$ through $2_n$, every time the descriptive information is received via the external system 100 or the MMI 11. More particularly, the CPU 13 outputs a data write command with respect to the memory $3_1$, for example, to the common bus 16, so that the bus decoder 27 of the independent unit $2_1$ decodes the data write command on the control bus 28 and writes the data on the control bus 28 into the memory $3_1$.

In this state, if the power unit $30_1$ of the independent unit $2_1$ fails, the control unit 1 can restart the independent unit $2_1$ from the state before the failure occurred by a recovery process based on the software and physical control information stored in the memory 14.

On the other hand, if the power unit 18 of the control unit 1 fails, the CPU 13 recovers the software information which is stored in one or a plurality of memories $3_1$ through $3_n$ of the independent units $2_1$ through $2_n$ by a recovery process. More particularly, the CPU 13 outputs a data read command with respect to the memory $3_1$, for example, to the common bus 16, so that the bus decoder 27 of the independent unit $2_1$ decodes the data read command the data read from the memory $3_1$ is output to the control bus 28. The CPU 13 reads the data on the control bus 28, and reproduces the software control information of a control table.

Preferably, the software control information is distributively stored in the memories $3_1$ through $3_n$ of two or more independent units $2_1$ through $2_n$. For example, the software control information for controlling the independent unit $2_1$ is stored in the memory $3_1$ of the independent unit $2_1$, the software control information for controlling the independent unit $2_2$ is stored in the memory $3_2$ of the independent unit $2_2$, ..., and the software control information for controlling the independent unit $2_n$ is stored in the memory $3_n$ of the independent unit $2_n$. By storing the software control information in such a manner, it is possible to efficiently provide a backup of the software control information without overlap of the software control information and by use of a relatively small memory capacity of the memories $3_1$ through $3_n$. In addition, because the software control information is distributively stored in blocks each corresponding to one independent unit, it is possible to unify the recovery process for recovering the software control information from each of the memories $3_1$ through $3_n$.

Of course, it is also possible to store all of the software control information for controlling the independent units $2_1$ through $2_n$ into the memory $3_1$ of the independent unit $2_1$. Furthermore, it is possible to store the same software control information for controlling the independent units $2_1$ through $2_n$ into the memory $3_2$ of the independent unit $2_2$, for example. In the former case, there is an advantage in that the recovery of all of the software control information can be made with ease at a high speed. On the other hand, in the latter case, it is possible to provide a positive backup of all of the software control information in case the software control information stored in the memory $3_1$ is damaged or destroyed for some reason. Moreover, the backup software control information may be stored in the memories of two or more independent units. In addition, the same software control information may be stored two or more times in a distributed manner.

On the other hand, the physical control information which is set by the CPU 13 with respect to the hardware such as the flip-flop 24 of one or more independent units $2_1$ through $2_n$ may also be read out directly from the hardware. More particularly, the CPU 13 outputs a read command with respect to a specific hardware to the common bus 16, so as to determine whether or not the output of the flip-flop 24 is "1" via the buffer circuit 26 of the independent unit $2_1$, for example. The CPU 13 reads the physical control information, that is, the descriptive data, from the hardware of all of the independent units $2_1$ through $2_n$, and adds the read physical control information to the control table of the memory 14. As a result, the CPU 13 reproduces a complete control table for controlling the independent units $2_1$ through $2_n$.

Figure 4:
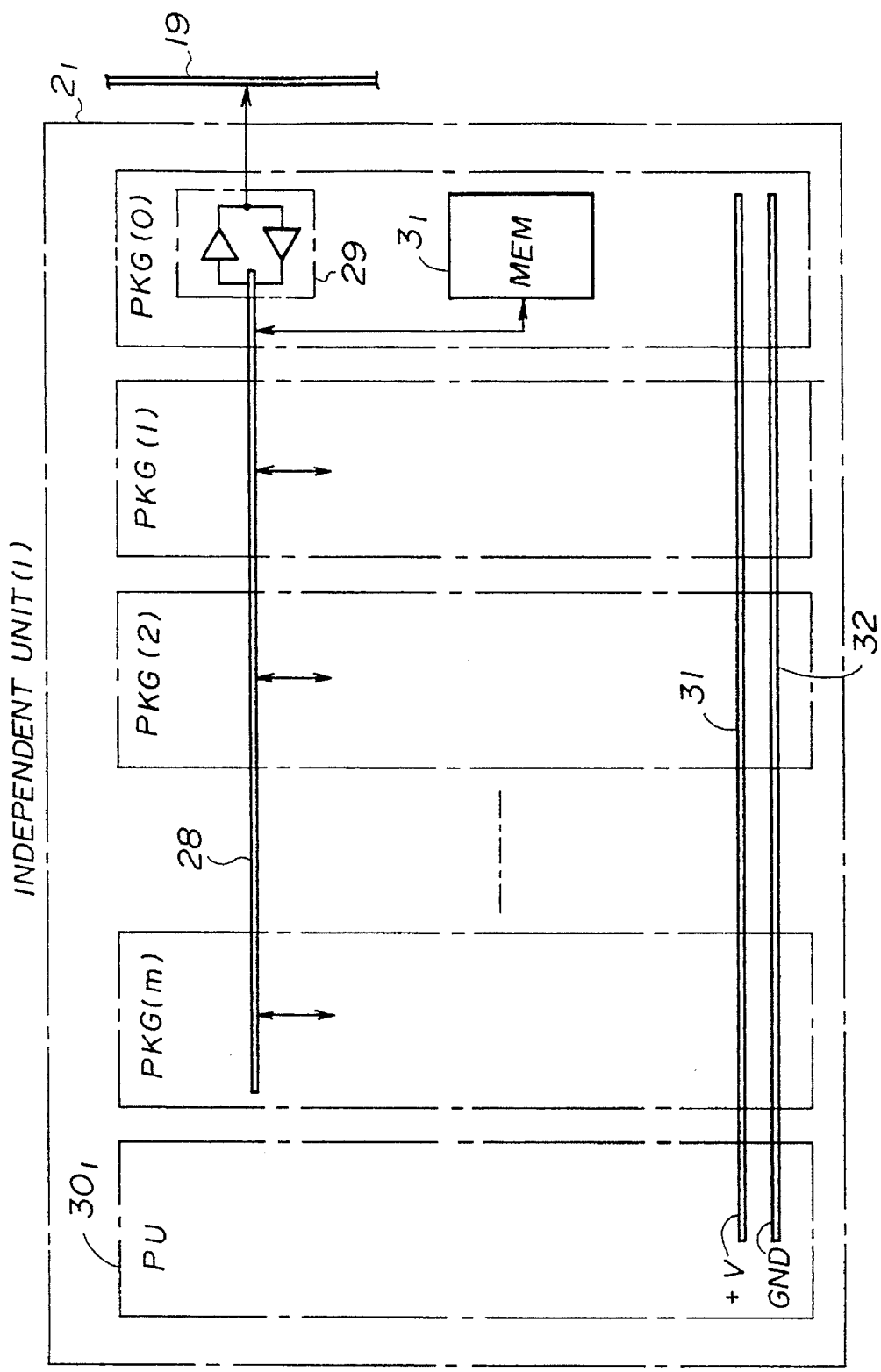
FIG. 4 is a diagram for explaining the installation of an independent unit of the embodiment shown in FIG. 3.

Next, a description will be given of the installation of the independent unit $2_1$ in the embodiment shown in FIG. 3, by referring to FIG. 4. In FIG. 4, those parts which are the same as those corresponding parts in FIG. 3 are designated by the same reference numerals, and a description thereof will be omitted.

In FIG. 4, a power line 31 is connected to the power unit $30_1$ for supplying a power source voltage +V, and a power line 32 is connected to the power unit $30_1$ for supplying a ground voltage GND. A plurality of packages PKG(0) through PKG(m) are installed within the independent unit $2_1$, and each package is driven by the power supplied from the power lines 31 and 32. For example, the package PKG(0) is provided with the circuit 29 and the memory $3_1$ in the common part of the independent unit $2_1$. In this case, the other packages PKG(1) through PKG(m) are provided with transmission lines.

For example, a unit number (1) is assigned to the independent unit $2_1$, and unit numbers (2) through (n) are similarly assigned to the independent units $2_2$ through $2_n$. The independent units $2_2$ through $2_n$ are installed similarly to the independent unit $2_1$, and thus, the CPU 13 can specify a specific package by one of the unit numbers (a) through (n) and the package number PKG(0) through PKG(m).

Figure 5:
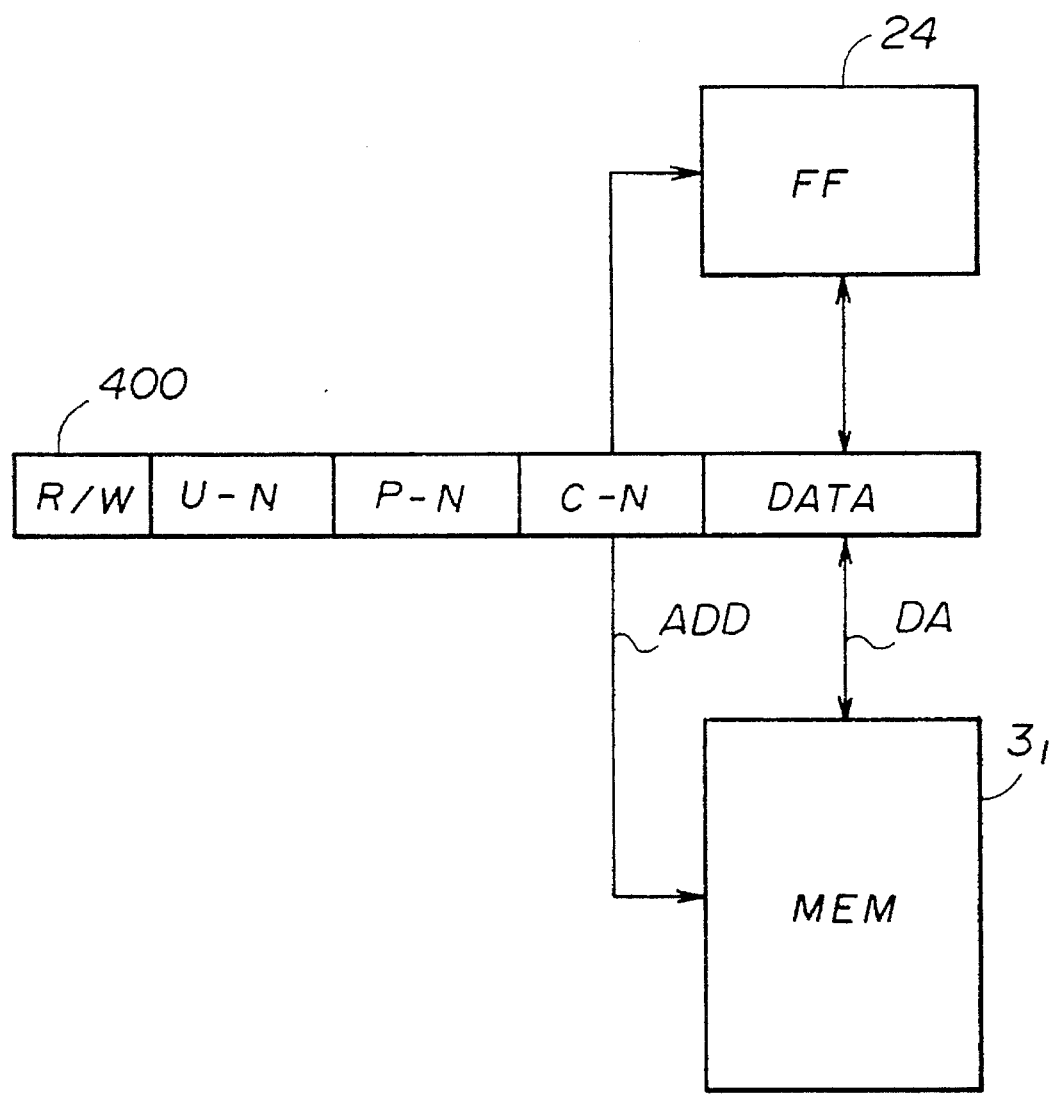
FIG. 5 is a diagram for explaining read/write commands used in the embodiment shown in FIG. 3.

FIG. 5 is a diagram for explaining read/write commands used in the embodiment shown in FIG. 3. In FIG. 5, a read/write command 400 is generated from the CPU 13.

In this embodiment, the read/write command 400 includes a read/write control part R/W, a unit number part U—N, a package number part P—N, a circuit number part C—N, and a data part DATA. The read/write control part R/W determines whether the read/write command 400 is a read command or a write command. The unit number part U—N specifies one of the unit numbers (1) through (n), and the package number part P—N specifies one of the package numbers PKG(0) through PKG(m). In addition, the circuit number part C—N specifies one circuit such as the flip-flop 24 within one package. When using the circuit number part C—N with respect to the memory $3_1$, for example, a plurality of circuit numbers are assigned to the memory $3_1$ beforehand, so that the memory $3_1$ and the address thereof are specified by the circuit number. The data part DATA stores the read data or the write data.

In the embodiment described above, the software control information and the physical control information are respectively explained as being the mode information for line switching and the channel information. However, the software control information and the physical control information are not limited to those of the described embodiment, and may respectively include other kinds of control information.

Of course, it is possible to provide a non-volatile memory 15 such as an EEPROM in FIG. 3, as in the case of the conventional system shown in FIG. 1. In a second embodiment of the control information backup system according to the present invention, the EEPROM 15 is provided. However, the illustration of this second embodiment will be omitted because the construction of the control unit 1 is identical to that shown in FIG. 1 and the construction of the independent units $2_1$ through $2_n$ is identical to that shown in FIG. 3.

Figure 6:
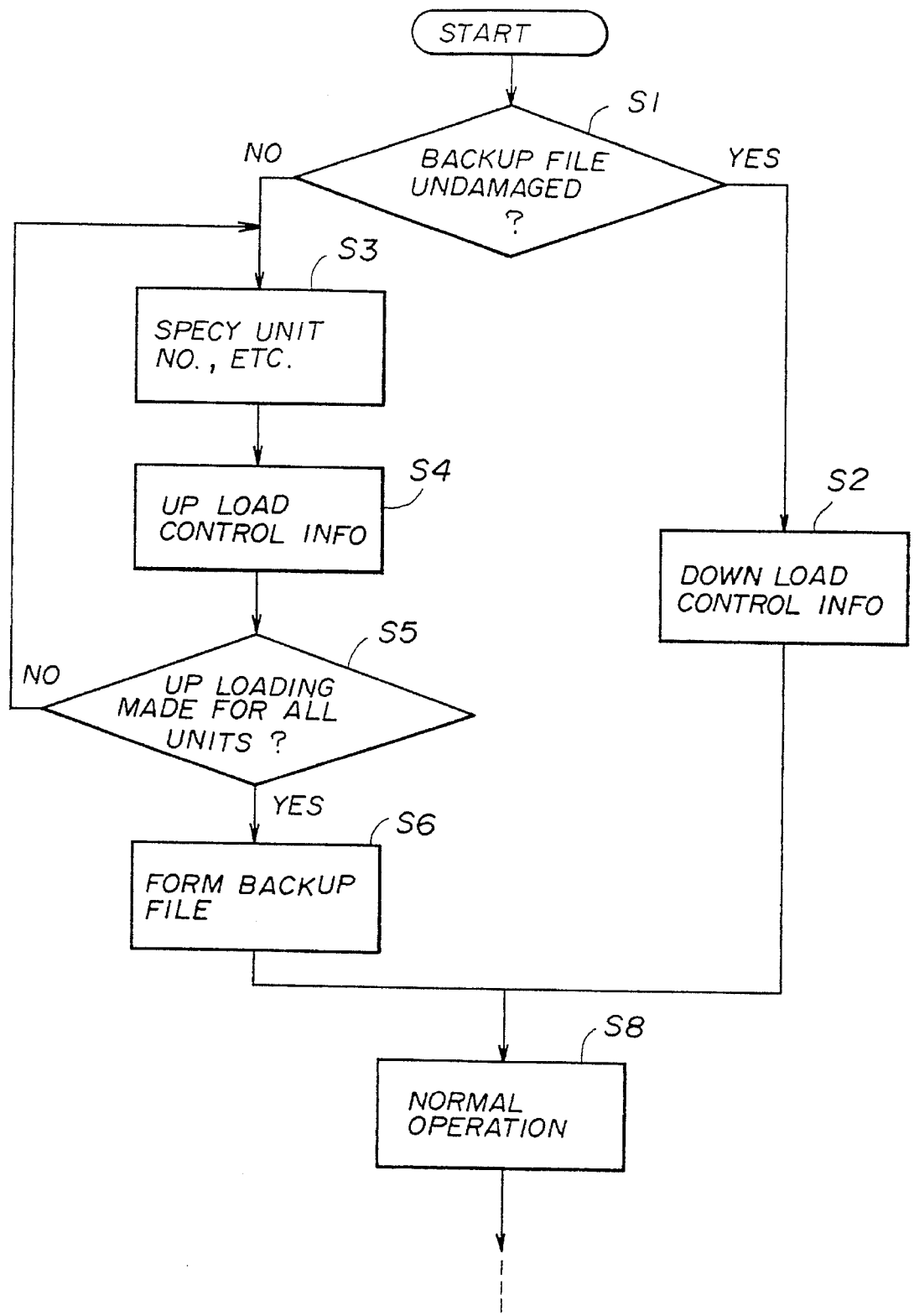
FIG. 6 is a flow chart for explaining the operation of a second embodiment of the control information backup system according to the present invention.

FIG. 6 is a flow chart for explaining the operation of the second embodiment. The recovery process shown in FIG. 6 is carried out by the CPU 13 of the control unit 1 if the power unit 18 of the control unit 1 fails.

In FIG. 6, a step S1 decides whether or not a backup file containing at least the necessary software control information exists undamaged by a known means such as sum check. In this embodiment, the backup file is stored in the EEPROM 15. If the decision result in the step S1 is YES, a step S2 down loads the software control information of the backup file from the EEPROM 15 into the memory 14 via the CPU 13, and the process advances to a step S8. The step S8 carries out the normal operation of the control unit 1.

On the other hand, if the decision result in the step S1 is NO, a step S3 specifies the unit number of the independent unit, the address of the memory and the like by the read/write command 400 shown in FIG. 5. In addition, a step S4 up loads the necessary software control information from the specified memory into the memory 14 via the CPU 13.

Then, a step S5 decides whether or not the up loading of the necessary software control information is made for all of the concerned independent units, and the process returns to the step S3 if the decision result in the step S5 is NO. In other words, if the necessary software control information is distributively stored in the memories of a plurality of independent units, the steps S3 through S5 are repeated until all of the necessary software control information is up loaded from the distributed memory locations.

On the other hand, if the decision result in the step S5 is YES, a step S6 forms a backup file containing the necessary software control information, and stores this backup file into the memory 14. Thereafter, the process advances to the step S8 and the normal operation of the control unit 1 is carried out.

Figure 7:
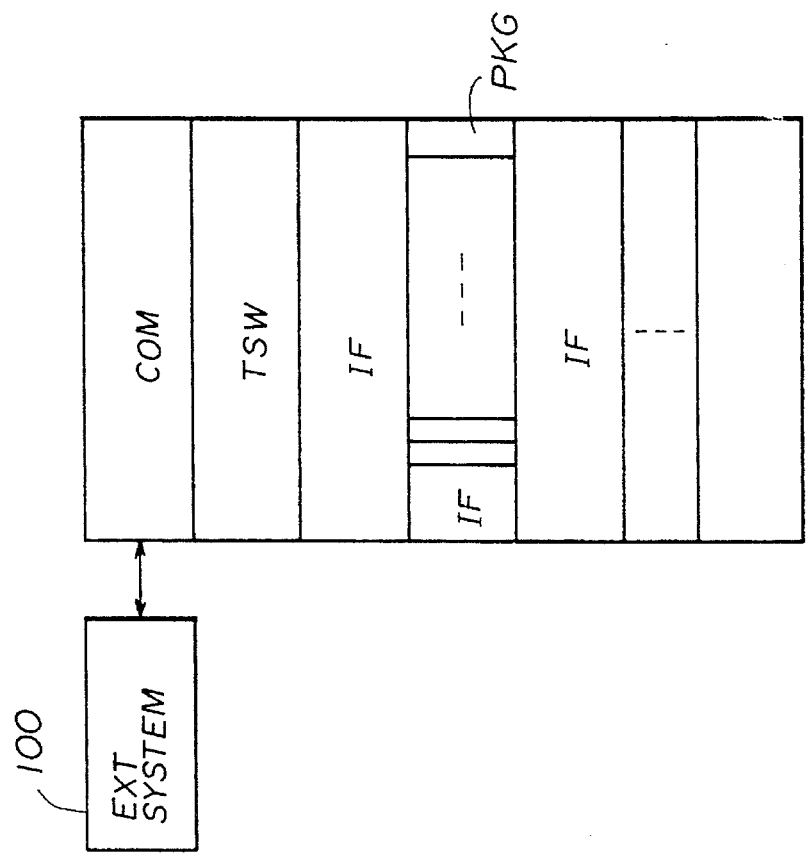
FIG. 7 is a system block diagram for explaining an application of the present invention to a cross-connect system.

Next, a description will be given of an application of the present invention to a cross-connect system. FIG. 7 shows a cross-connect system applied with the present invention, and FIG. 8 generally shows an essential part of the cross-connect system.

In FIG. 7, the cross-connect system includes a control unit COM which is coupled to an external system 100, a time switch TSW, and a plurality of interfaces IFs. The control unit COM corresponds to the control unit 1 shown in FIG. 3, and the time switch TSW and the interfaces IFs correspond to the independent units $2_1$ through $2_n$ shown in FIG. 3. As shown in FIG. 7 for one interface IF, each interface IF is made up of a plurality of packages similar to those shown in FIG. 4. The time switch TSW is also made up of a plurality of packages similar to those shown in FIG. 4.

Figure 8:
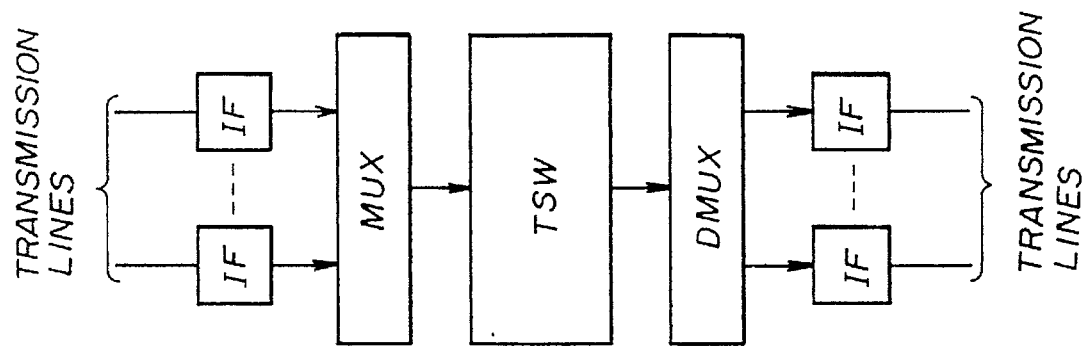
FIG. 8 is a system block diagram generally showing an essential part of the cross-connect system.

As shown in FIG. 8, an essential part of the cross-connect system includes the time switch TSW, a multiplexer MUX coupled to the input of the time switch TSW, a demultiplexer DMUX coupled to the output of the time switch TSW, the interfaces IF which are coupled to the multiplexer MUX, and the interface IF which are coupled to the demultiplexer DMUX. Each interface IF couples to a transmission line which is made up of a plurality of transmission paths (channels). Hence, by controlling the switching timing of the time switch TSW 1 by the control unit COM, it is possible to cross-connect an arbitrary transmission path at the input to an arbitrary transmission path at the output. In addition, it is also possible to cross-connect an arbitrary transmission line at the input to an arbitrary transmission line at the output.

In such a cross-connect system, it is essential that the control unit COM can make a satisfactory recovery process after the power unit of the control unit COM fails, so that the cross connection can be made correctly from the state when the failure occurred by appropriately controlling each of the time switch TSW and the interfaces IFs. Accordingly, it is possible to considerably improve the reliability of the cross-connect system if the present invention is applied thereto, because it is possible to guarantee the complete recovery of the software control information from the memory of the independent units and also guarantee the complete recovery of the set physical control information directly from the hardware of the independent units when making the recovery process after the power unit of the control unit fails.

The time switch TSW and the interfaces IFs themselves are known, and a detailed description thereof will be omitted. For example, a Japanese Laid-Open Patent Application No. 3-98320 discloses the structure and operation of the time switch TSW and the interfaces IFs, particularly with reference to FIG. 6 thereof. On the other hand, the general construction and operation of the cross-connect system are also known, and a detailed description thereof will be omitted. For example, a Japanese Laid-Open Patent Application No. 4-100397 discloses the general construction and operation of the cross-connect system, particularly with reference to FIG. 2 thereof.

Further, the present invention is not limited to these embodiments, but various variations and modifications may be made without departing from the scope of the present invention.

What is claimed is:

1. A control information backup system in combination with a transmission system, comprising:
   a single control unit which is driven by a first power unit and includes first memory means for storing software control information which is used during a software operation of said control unit; and
   a plurality of independent units which are coupled to said control unit and are controlled by said control unit, said independent units being driven by respective second power units which are different from the first power unit, each independent unit including second memory means, said control unit including control means connected to said second memory means of at least arbitrary ones of said independent units, said second memory means of said at least arbitrary ones of said independent units storing said software control information, said control means reading out said software control information from the second memory means of said at least arbitrary ones of said independent units when making a recovery process of said control unit after a failure of the first power unit.

2. The control information backup system as claimed in claim 1, wherein said control means of the control unit stores the same software control information in the second memory means of a plurality of said independent units.

3. The control information backup system as claimed in claim 2, wherein said control means of the control unit stores the software control information distributively in the second memory means of said arbitrary ones of said independent units.

4. The control information backup system as claimed in claim 1, wherein said control means of the control unit stores the software control information distributively in the second memory means of said arbitrary ones of said independent units.

5. The control information backup system as claimed in claim 4, wherein said control unit includes means for setting physical control information with respect to a hardware of one or a plurality of said independent units, and said control means of the control unit also reads the set physical control information from the hardware of the one or plurality of said independent units.

6. The control information backup system as claimed in claim 1, wherein said control unit and said independent units form a cross connect system for cross-connecting a plurality of transmission lines.

7. The control information backup system as claimed in claim 1, wherein said first memory means includes a non-volatile backup memory for storing the software control information, and said control means of the control unit reads out the software control information from the second memory means when making the recovery process only if the software control information stored in the non-volatile backup memory is damaged.

* * * * *